US008001026B2

(12) United States Patent
Brodsky et al.

(10) Patent No.: US 8,001,026 B2
(45) Date of Patent: Aug. 16, 2011

(54) METHOD AND SYSTEM FOR CREATING AND TRADING DERIVATIVE INVESTMENT INSTRUMENTS BASED ON AN INDEX OF INVESTMENT MANAGEMENT COMPANIES

(75) Inventors: William Brodsky, Chicago, IL (US); William Speth, Evanston, IL (US)

(73) Assignee: Chicago Board Options Exchange, Chicago, IL (US)

( * ) Notice: Subject to any disclaimer, the term of this patent is extended or adjusted under 35 U.S.C. 154(b) by 42 days.

(21) Appl. No.: 12/648,045

(22) Filed: Dec. 28, 2009

(65) Prior Publication Data

US 2010/0191669 A1 Jul. 29, 2010

Related U.S. Application Data

(63) Continuation of application No. 11/513,893, filed on Aug. 31, 2006, now Pat. No. 7,664,692.

(51) Int. Cl.
*G06Q 40/00* (2006.01)
(52) U.S. Cl. ............. 705/35; 705/36; 705/36 R; 705/37; 705/39
(58) Field of Classification Search .................. 705/1, 4, 705/35, 36, 36 R, 37, 39
See application file for complete search history.

(56) References Cited

U.S. PATENT DOCUMENTS

| | | |
|---|---|---|
| 7,085,738 B2 | 8/2006 | Tarrant |
| 7,225,153 B2 | 5/2007 | Lange |
| 7,296,025 B2 | 11/2007 | Kung et al. |
| 7,321,872 B1 | 1/2008 | Kaminsky et al. |
| 7,356,498 B2 | 4/2008 | Kaminsky et al. |
| 7,552,083 B2 | 6/2009 | Carone et al. |
| 7,562,046 B2 | 7/2009 | O'Callahan |
| 2002/0087365 A1* | 7/2002 | Kavanaugh ........................ 705/4 |
| 2002/0099640 A1* | 7/2002 | Lange ............................. 705/37 |
| 2002/0147670 A1* | 10/2002 | Lange ............................. 705/35 |
| 2003/0004858 A1 | 1/2003 | Schmitz et al. |
| 2003/0097319 A1* | 5/2003 | Moldovan et al. .............. 705/35 |
| 2003/0115128 A1* | 6/2003 | Lange et al. .................... 705/37 |
| 2003/0167175 A1* | 9/2003 | Salom ............................. 705/1 |
| 2003/0172026 A1* | 9/2003 | Tarrant ........................... 705/39 |
| 2003/0236738 A1 | 12/2003 | Lange et al. |
| 2004/0111358 A1* | 6/2004 | Lange et al. .................... 705/37 |
| 2004/0117284 A1* | 6/2004 | Speth ............................. 705/36 |

(Continued)

OTHER PUBLICATIONS

Ref. U—Anonymous, Diamond futures may be on their way back as exchange-traded instruments, group says. Diamond Cutters International, The Associated Press, Sep. 17, 2007, pp. 1-3.*

(Continued)

*Primary Examiner* — James P Trammell
*Assistant Examiner* — B. Joan Amelunxen
(74) *Attorney, Agent, or Firm* — Brinks Hofer Gilson & Lione

(57) ABSTRACT

A method and system for creating a stock index for a group of investment management companies is disclosed. The method may include obtaining first trade information for each security representative of the group of investment management companies during a first time period, aggregating the first trade information for a predetermined time period, storing the aggregated first trade information, calculating from the aggregated first trade information an index for the group of investment management companies, determining a standardized measure of the index based on the aggregated first trade information obtained in the first time period, and periodically recalculating the index based on second trade information for each security representative of the group of investment management companies during a second time period.

15 Claims, 6 Drawing Sheets

U.S. PATENT DOCUMENTS

| | | |
|---|---|---|
| 2004/0215538 A1 | 10/2004 | Smith et al. |
| 2005/0209945 A1 | 9/2005 | Ballow et al. |
| 2005/0216384 A1* | 9/2005 | Partlow et al. ............... 705/35 |
| 2006/0106700 A1* | 5/2006 | Boren et al. ............... 705/35 |
| 2006/0106713 A1 | 5/2006 | Tilly et al. |
| 2006/0143099 A1 | 6/2006 | Partlow et al. |
| 2006/0167788 A1 | 7/2006 | Tilly et al. |
| 2006/0167789 A1 | 7/2006 | Tilly et al. |
| 2006/0229968 A1 | 10/2006 | Hustad et al. |
| 2006/0253355 A1 | 11/2006 | Shalen |
| 2006/0253359 A1 | 11/2006 | O'Callahan |
| 2006/0253368 A1 | 11/2006 | O'Callahan et al. |
| 2006/0253369 A1 | 11/2006 | O'Callahan |
| 2006/0253370 A1 | 11/2006 | Feuser et al. |
| 2006/0293998 A1 | 12/2006 | Tilly et al. |
| 2007/0078740 A1 | 4/2007 | Landle et al. |
| 2007/0106585 A1 | 5/2007 | Miller |
| 2007/0112659 A1 | 5/2007 | Shalen et al. |
| 2007/0198386 A1* | 8/2007 | O'Callahan et al. ....... 705/36 R |
| 2008/0071598 A1 | 3/2008 | Masuyama et al. |
| 2008/0120249 A1 | 5/2008 | Hiatt |
| 2008/0120250 A1 | 5/2008 | Hiatt, Jr. |

OTHER PUBLICATIONS

William J. Brodsky, After the Crash: Linkages between Stocks and Futures: A Futures Perspective, AEI Studies, No. 477; Robert J. MacKay, Ed.; Wash., DC, pp. 55-62, 1988.

William J. Brodsky, Global Futures Trading Systems, Regulation: The Cato Review of Business & Government; Hans R. Stoll, Ed.; Quorum Books, pp. 1-12, 1990.

Susquehanna Creates Investment Management Company Index, written by Journal of Indexes Staff, Jul. 1, 2003.

William J. Brodsky, Global Futures Trading System, International Finance & Financial Policy, Hans R. Stoll, Ed.; Quorum Books, Ch. 24, pp. 211-217, 1990.

* cited by examiner

| Symbol | Name | Price 5(31)08 | Shares Out (M) | Cap ($M) | Cap Weight | Modified Shares Out (M) | Modified Cap ($M) | Modified Index Weight | Options? | 3 Month Stk, ADV |
|---|---|---|---|---|---|---|---|---|---|---|
| BEN | FRANKLIN RESOURCES INC. | $89.95 | 259.97 | $23,384 | 21.6 % | 74.88 | 6,735.55 | 9.4 % | Listed | 1,152,484 |
| PFG | PRINCIPAL FINANCIAL GROUP | $54.65 | 276.88 | $15,137 | 14.0 % | 151.48 | 8,278.38 | 11.6 % | Listed | 751,741 |
| LM | LEGG MASON INC | $95.93 | 126.54 | $12,139 | 11.2 % | 59.85 | 5,740.93 | 8.0 % | Listed | 1,424,430 |
| AMP | AMERIPRISE FINANCIAL INC | $45.77 | 244.39 | $11,185 | 10.3 % | 165.51 | 7,576,21 | 10.6 % | Listed | 1,039,910 |
| TROW | T ROWE PRICE GROUP INC | $79.10 | 132.79 | $10,503 | 9.7 % | 97.66 | 7,724.67 | 10.8 % | Listed | 621,348 |
| AVZ | AMVESCAP PLC-SPONSORED ADR | $19.55 | 404.73 | $7,912 | 7.3 % | 373.67 | 7,305.25 | 10.2 % | Eligible | 382,854 |
| AB | ALLIANCEBERSTEIN HOLDING LP | $65.28 | 84.13 | $5,492 | 5.1 % | 84.13 | 5,492.01 | 7.7 % | Listed | 209,385 |
| JNS | JANUS CAPITAL GROUP INC | $18.01 | 211.64 | $3,812 | 3.5 % | 211.64 | 3,811.56 | 5.3 % | Listed | 1,877,043 |
| JNC | NUVEEN INVESTEMENTS-CL A | $44.91 | 79.21 | $3,557 | 3.3 % | 79.21 | 3,557.23 | 5.0 % | Listed | 567,119 |
| FII | FEDERATED INVESTORS INC-CL B | $32.12 | 106.84 | $3,432 | 3.2 % | 106.84 | 3,431.64 | 4.8 % | Listed | 708,583 |
| EV | EATON VANCE CORP | $28.52 | 128.94 | $3,420 | 3.2 % | 128.94 | 3,419.52 | 4.8 % | Listed | 646,722 |
| AMG | AFFILIATED MANGERS GROUP | $90.20 | 33.74 | $3,043 | 2.8 % | 33.74 | 3,043.08 | 4.3 % | Listed | 667,062 |
| BLK | BLACKROCK INC-CLASS A | $134.00 | 20.02 | $2,683 | 2.5 % | 20.02 | 2,683.22 | 3.8 % | Listed | 279,377 |
| WDR | WADDELL & REED FINANCIAL-A | $22.20 | 84.75 | $1,888 | 1.7 % | 84.75 | 1,888.12 | 2.6 % | Listed | 544,308 |
| CLMS | CALAMOS ASSET MANAGEMENT-A | $31.79 | 23.16 | $736 | 0.7 % | 23.16 | 736.32 | 1.0 & | Eligible | 220,860 |
| | TOTAL | | | $108,323 | | | $71,423 | | | |

FIGURE 2b

METHOD AND SYSTEM FOR CREATING AND TRADING DERIVATIVE INVESTMENT INSTRUMENTS BASED ON AN INDEX OF INVESTMENT MANAGEMENT COMPANIES

RELATED APPLICATIONS

The present application is a continuation of U.S. patent application Ser. No. 11/513,893, filed Aug. 31, 2006 now U.S. Pat. No. 7,664,692, the entirety of which is hereby incorporated by reference.

TECHNICAL FIELD

The present disclosure relates generally to financial trading systems and more particularly to the creation, identification, processing, trading, quotation, and valuation of investment management company index-linked derivative investment instruments.

BACKGROUND

An index is a statistical composite that is used to indicate the performance of a market or a market sector over various time periods. Examples of indices that are used to gauge the performance of stocks and other securities in the United States include the Dow Jones® Industrial Average, the National Association of Securities Dealers Automated Quotations (NASDAQ®) Composite Index, the New York Stock Exchange® Composite Index, etc. In general, the Dow Jones® Industrial Average contains thirty (30) stocks that trade on the New York Stock Exchange® and is a general indicator of how shares of the largest United States companies are trading. The NASDAQ® Composite Index is a composite index of more than three thousand (3,000) companies listed on the NASDAQ® (also referred to as over-the-counter or OTC stocks). It is designed to indicate the stock performance of small-cap and technology stocks. Finally, the New York Stock Exchange® Composite Index is a composite index of shares listed on the New York Stock Exchange®.

In equal-dollar weighted indices, the weights of each component are reset to equal values at regular intervals, such as for example, every quarter. Between re-adjustments, the weights of the various index components will deviate from the equal-dollar weighting values as the values of the components fluctuate. Periodically, indices must be adjusted in order to reflect changes in the stock value of component companies comprising the index, or to maintain the original intent of the index in view of changing conditions in the market. For example, if a component stock's weight drops below an arbitrary threshold, or if a component company significantly alters its line of business or is taken over by another company so that it no longer represents the type of company which the index is intended to track, the index may no longer be influenced by, or reflect the aspects of the market for which it was originally designed. In such cases it may be necessary to replace a component stock with a suitable replacement stock. If a suitable replacement that preserves the basic character of the index cannot be found, the stock may simply be dropped without adding a replacement. Conversely, activity in the market for which an index is created may dictate that a new stock (which was not originally included in the index) having a strong impact in the market be added to the index to adequately reflect the market without eliminating other components. In each case, the divisor may be adjusted so that the index remains at the same level immediately after the new stock is added or the old stock is eliminated.

Derivatives are financial securities whose values are derived in part from a value or characteristic of some other underlying asset or variable (the underlying asset). The underlying asset may include securities such as stocks, market indicators and indices, interest rate, and corporate debt, such as bonds, to name but a few. Two common forms of derivatives are options contracts and futures contracts, discussed herein below.

An option is a contract giving the holder of the option the right, but not the obligation, to buy or sell an underlying asset at a specific price on or before a certain date. Generally, a party who purchases an option is said to have taken a long position with respect to the option. The party who sells the option is said to have taken a short position. There are generally two types of options: calls and puts. An investor who has taken a long position in a call option has bought the right to purchase the underlying asset at a specific price, known as the "strike price." If the long investor chooses to exercise the call option, the long investor pays the strike price to the short investor, and the short investor is obligated to deliver the underlying asset.

Alternatively, an investor who has taken a long position in a put option receives the right, but not the obligation to sell the underlying asset at a specified price, again referred to as the strike price on or before a specified date. If the long investor chooses to exercise the put option, the short investor is obligated to purchase the underlying asset from the long investor at the agreed upon strike price. The long investor must then deliver the underlying asset to the short investor. Thus, the traditional settlement process for option contracts involves the transfer of funds from the purchaser of the underlying asset to the seller, and the transfer of the underlying asset from the seller of the underlying asset to the purchaser. Cash settlement, however, is more common. Cash settlement allows options contracts to be settled without actually transferring the underlying asset.

A call option is "in-the-money" when the price or value of the underlying asset rises above the strike price of the option. A put option is "in-the-money" when the price or value of the underlying asset falls below the strike price of the option. An at-the-money option wherein the price or value of the underlying asset is equal to the strike price of the option. A call option is out-of-the-money when the price or value of the underlying asset is below the strike price. A put option is out-of-the-money when the price or value of the underlying asset is above the strike price. If an option expires at-the-money or out-of-the-money, it has no value. The short investor retains the amount paid by the long investor (the option price) and pays nothing to the long investor. Cash settlement of an in-the-money option, be it a call or a put, however, requires the short investor to pay to the long investor the difference between the strike price and the current market value of the underlying asset.

Cash settlement allows options to be based on more abstract underlying "assets" such as market indicators, stock indices, interest rates, futures contracts and other derivatives. For example, an investor may take a long position in a market index call option. In this case, the long investor receives the right to "purchase" not the index itself, but rather a cash amount equal to the value of the index (typically multiplied by a multiplier) at a specified strike value. An index call option is in-the-money when the value of the index rises above the strike value. When the holder of an in-the-money index call option exercises the option, the short investor on the opposite side of the contract is obligated to pay the long investor the difference between the current value of the index and the strike price, usually multiplied by the multiplier. If the current value of the index is less than or equal to the strike value, the option has no value. An index put option works in the same way but in reverse, having value, or being in-the-money when the value of the index falls below the strike value.

Futures contracts are another common derivative security. In a futures contract a buyer purchases the right to receive delivery of an underlying commodity or asset on a specified date in the future. Conversely, a seller agrees to deliver the commodity or asset to an agreed location on the specified date. Futures contracts originally developed in the trade of agricultural commodities, but quickly spread to other commodities as well. Because futures contracts establish a price for the underlying commodity in advance of the date on which the commodity must be delivered, subsequent changes in the price of the underlying asset will inure to the benefit of one party and to the detriment of the other. If the price rises above the futures price, the seller is obligated to deliver the commodity at the lower agreed upon price. The buyer may then resell the received product at the higher market price to realize a profit. The seller in effect loses the difference between the futures contract price and the market price on the date the goods are delivered. Conversely if the price of the underlying commodity falls below the futures price, the seller can obtain the commodity at the lower market price for delivery to the buyer while retaining the higher futures price. In this case the seller realizes a profit in the amount of the difference between the current market price on the delivery date and the futures contract price. The buyer sees an equivalent loss.

Like options contracts, futures contracts may be settled in cash. Rather than actually delivering the underlying asset, cash settlement merely requires payment of the difference between the market price of the underlying commodity or asset on the delivery date and the futures contract price. The difference between the market price and the futures price is to be paid by the short investor to the long investor, or by the long investor to the short investor, depending on which direction the market price has moved. If the prevailing market price is higher than the contract price, the short investor must pay the difference to the long investor. If the market price has fallen, the long investor must pay the difference to the short investor.

Again, like options, cash settlement allows futures contracts to be written against more abstract underlying "assets" or "commodities," such as market indicators, stock indices, interest rates, futures contracts and other derivatives. For example, an investor may take a long position in a market index futures contract. In this case, the long investor "buys" the index at a specified futures price (i.e. a future value of the index on the "delivery" date). The index based futures contract is cash settled. One party to the contract pays the difference between the futures price and the actual value of the index (often multiplied by a specified multiplier) to the other investor depending on which direction the market has moved. If the value of the index has moved above the futures price, or futures value, the short investor pays the difference the long investor. If the value of the index has moved below the futures price, or futures value the long investor pays the difference to the short investor.

Cash settlement provides great flexibility regarding the types of underlying assets that derivative investment instruments may be built around. Essentially any variable whose value is subject to change over time, may serve as the underlying asset for a derivative investment instrument. While standard derivatives may be based on many different underlying assets, there is a need for an improved availability of index-based derivative instruments.

BRIEF SUMMARY

In order to address the need for improvements on derivative investment instruments, investment management company index derivative investment instruments and methods for creating an investment management company index are disclosed herein based on a stock index for a predetermined group of publicly traded investment management companies.

According to a first aspect of the disclosure, a method for creating a stock index for a predetermined group of investment management companies is disclosed including obtaining first trade information for each security representative of the predetermined group of investment management companies during a first time period, aggregating the first trade information for a predetermined time period, storing the aggregated first trade information, calculating from the aggregated first trade information an index for the predetermined group of investment management companies, determining a standardized measure of the index utilizing the aggregated first trade information obtained in the first time period, and periodically recalculating the index based on second trade information for each security representative of the predetermined group of investment management companies during a second time period.

According to another aspect of the disclosure, a derivative investment instrument is disclosed including basing a derivative contract on an underlying index that estimates sector performance of publicly traded investment management companies.

According to yet another aspect of the disclosure, an investment management company index derivative investment instrument is disclosed including an underlying index of securities representative of a predetermined group of investment management companies, a strike price for the index at an expiration of the investment management company index derivative investment instrument, a premium for the investment management company index derivative investment instrument, and a multiplier for hedging at least a portion of a stock portfolio against the investment management company index derivative investment instrument.

According to still another aspect of the disclosure, a method for creating a stock index for a predetermined group of investment management companies is disclosed including collecting stock price data of the predetermined group of investment management companies on a re-balancing date, associating a fixed monetary unit value to a stock portfolio comprising the predetermined group of investment management companies, dividing the fixed monetary unit value by a number of constituents in the predetermined group of investment management companies to obtain a constituent weighting value, and dividing the stock price data by the constituent weighting value to obtain a constituent rebalancing value.

BRIEF DESCRIPTION OF THE DRAWINGS

For the purpose of facilitating an understanding of the subject matter sought to be protected, there is illustrated in the accompanying drawings an embodiment thereof, from an inspection of which, when considered in connection with the following description, the subject matter sought to be protected, its construction and operation, and many of its advantages should be readily understood and appreciated.

FIG. 2a is a flow diagram of one embodiment of a method for creating a stock index for a predetermined group of investment management companies and FIG. 2b is a table illustrating various selected investment management companies for use in calculating an index.

DETAILED DESCRIPTION OF THE DRAWINGS

Figure 1:
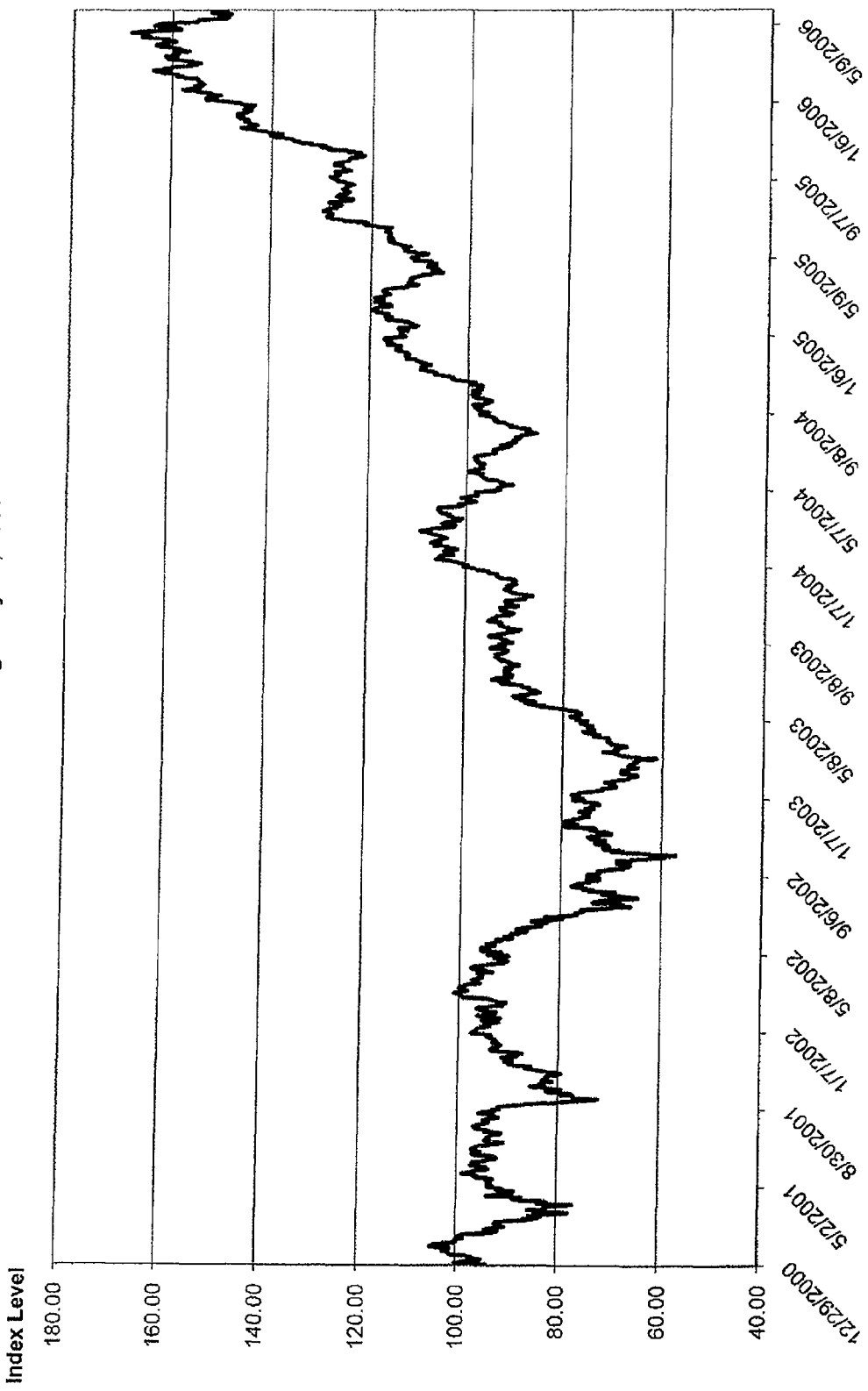
FIG. 1 is a graph illustrating one embodiment of an example index that estimates sector performance of publicly traded investment management companies.

Referring now to FIG. 1, one embodiment of an investment management company index is illustrated that estimates sector performance of publicly traded investment management companies. The investment management company index may be an equal-dollar weighted Micro-Sector index composed of constituents including investment management companies, all of which are listed common stocks. However, the number of constituents is flexible and may be subject to additions and/or deletions. The constituents are typically either traded on the New York Stock Exchange (NYSE) or the National Association of Securities Dealers Automated Quotations (NASDAQ) Stock Market. Further, the investment management company index may be re-balanced on a quarterly basis, for example, after the close of trading on the third Friday of March, June, September and December.

Figure 2A:
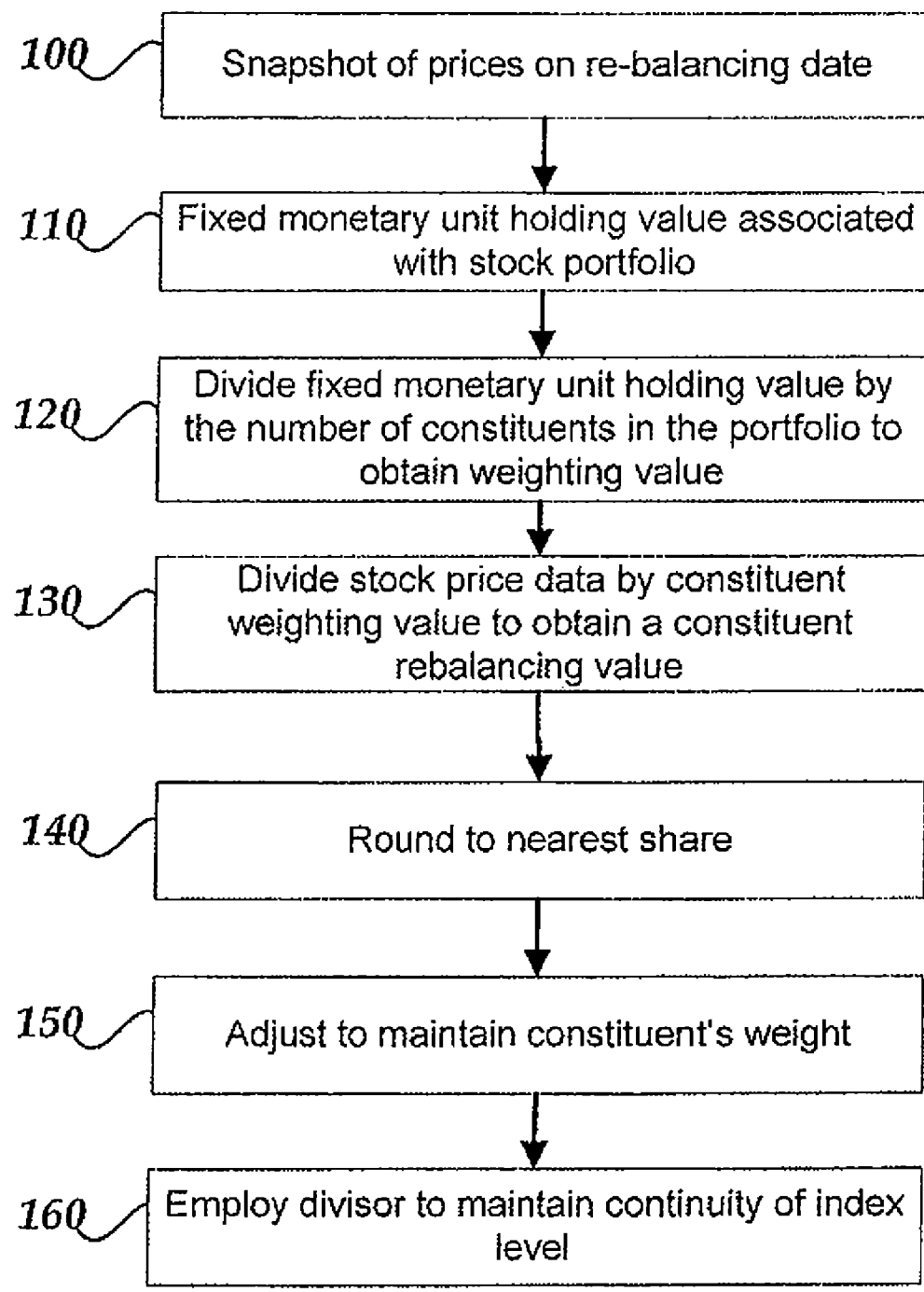

As shown in FIGS. 2a and 2b, one embodiment of a method to calculate the investment management company index of FIG. 1 is based on a snapshot of prices on a re-balancing date (at step 100). Example data captured from various selected investment management companies for use in calculating the index is illustrated in FIG. 2b. Typically, this capturing of price data occurs on the third Friday of March, June, September and December. Next, as further illustrated in the steps of FIG. 2a, a fixed monetary unit, for example the dollar, value or holding value is associated with a stock portfolio including the predetermined group of investment management companies for the entire portfolio (at step 110). The fixed monetary unit holding value is then divided by the number of constituents in the predetermined group of investment management companies to obtain a constituent weighting value (at step 120). The stock price data is divided by the constituent weighting value to obtain a constituent rebalancing value (at step 130). This constituent rebalancing value is an approximate value at which each constituent in the predetermined group of investment management companies will be weighted. In another embodiment, the price can be divided by constituent dollar weighting, and rounded to the nearest share, thereby resulting in a number of shares the constituent is assigned at the re-balancing (step 140). Preferably, on an ongoing basis, when there is a stock split, reversal, or other change that does not affect market value merely as a result of the change, shares are adjusted to maintain that component's weight (step 150). A divisor may be employed to maintain the continuity of the index level (step 160).

Figure 3:
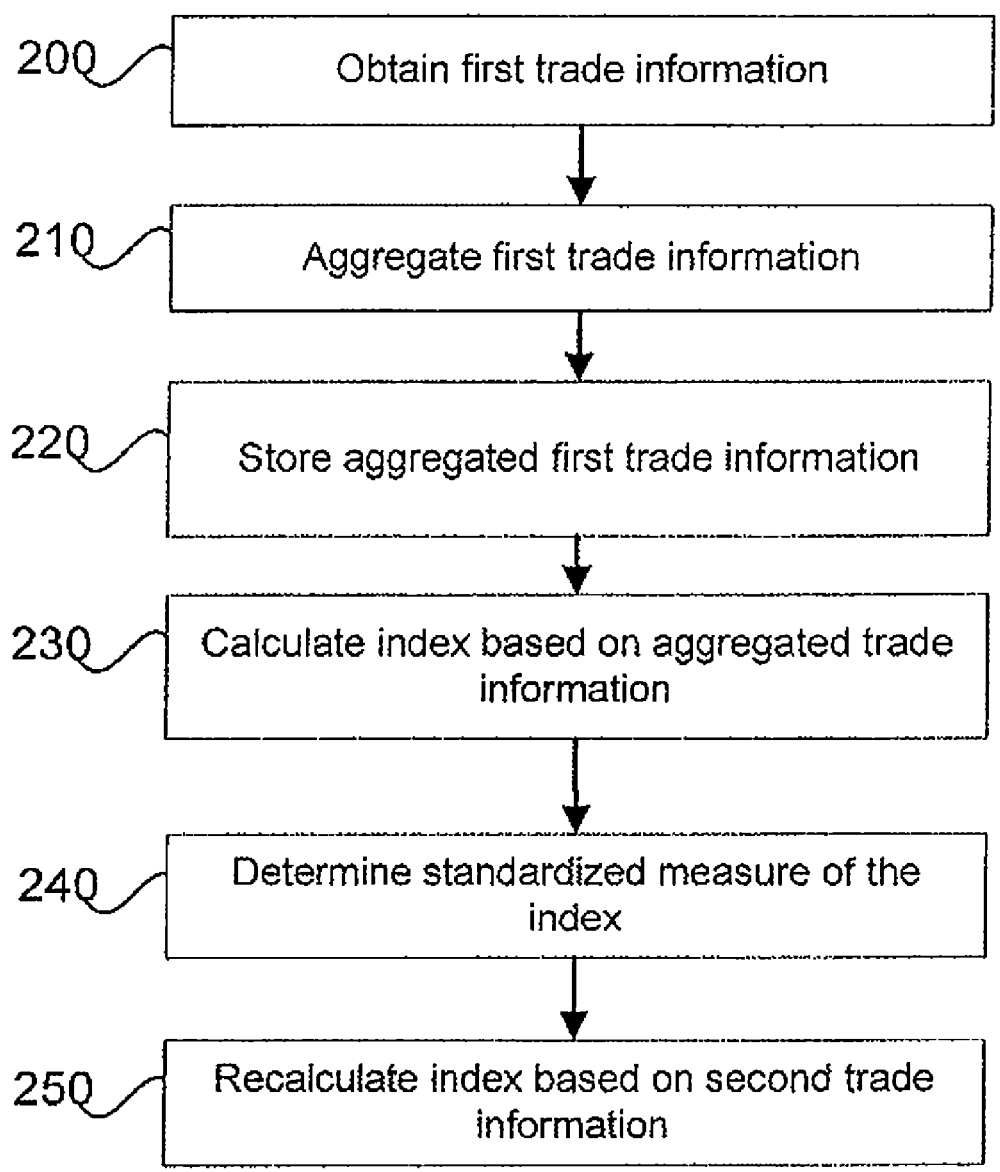
FIG. 3 a flow diagram of another embodiment of a method for creating a stock index for a predetermined group of investment management companies.

Another embodiment of a method utilized to calculate the investment management company index of FIG. 1 is illustrated in FIG. 3. Accordingly, first trade information, such as stock price, is obtained for each security representative of the predetermined group of investment management companies during a first time period (at step 200). This first trade information is aggregated for a predetermined time period, such as a single point in time during a trading day, at step 210. Preferably, the aggregated first trade information is stored in a computer memory at step 220. At step 230, the aggregated first trade information is used to calculate an index for the predetermined group of investment management companies. Additionally, at step 240, a standardized measure of the index is determined utilizing the aggregated first trade information obtained in the first time period. Further, the index is periodically recalculated based on second trade information for each security representative of the predetermined group of investment management companies during a second time period (at step 250).

Example Contract—Investment Management Company Index Options

Contract Specifications for an option based on an embodiment of the investment management company index detailed above are as follows:

Underlying: The investment management company index is a modified market capitalization-weighted Micro-Sector index composed of 15 publicly traded, U.S.-listed stocks of investment management companies, all of which are listed common stocks, that derive at least 50% of their revenues directly from asset management. The components are typically traded on either the NYSE or the NASDAQ Stock Market. Further, the index may be re-balanced on a quarterly basis (after the close of trading on the third Friday of March, June, September and December).

Multiplier: $100.

Strike Price Intervals: Strike prices below 200 are listed with minimum intervals of 2.5 points. Strike prices above 200 are listed with minimum intervals of 5 points Strike (Exercise) Prices: In-, at- and out-of-the-money strike prices are initially listed. New strikes can be added as the indexes move up or down.

Premium Quotation: Stated in decimals. One point equals $100. Minimum tick for options trading below 3.00 is 0.05 ($5.00) and for all other series, 0.10 ($10.00).

Exercise Style: European—generally the options may be exercised only on the last business day before expiration.

Expiration Date: Saturday following the third Friday of the expiration month.

Expiration Months: Up to three near-term months plus up to three months on the March quarterly cycle. Long-term Equity Anticipation Securities (LEAPS) with expirations up to five years in the future may also be listed.

Settlement of Option Exercise: Exercise will result in delivery of cash on the business day following expiration. The exercise settlement value (EXH) is calculated using the first (opening) reported sales price in the primary market of each component security on the last business day (usually a Friday) before the expiration date. If a security in the index does not open on the day on which the exercise-settlement value is determined, the last reported sales price in the primary market shall be used in calculating the exercise-settlement value. The exercise-settlement amount is equal to the difference between the exercise-settlement value and the exercise price of the option, multiplied by $100.

Margin: For purchases of puts or calls with more than 9 months until expiration, deposit/maintain 75% of the total cost/option current market value. When time to expiration reaches 9 months, the option no longer has value for margin purposes. Purchases of puts or calls with 9 months or less until expiration must be paid for in full. Writers of uncovered puts or calls must deposit/maintain 100% of the option proceeds plus 20% of the aggregate contract value (current index level×$100) minus the amount by which the option is out-of-the-money, if any, subject to a minimum for calls of option proceeds plus 10% of the aggregate contract value and a minimum for puts of option proceeds plus 10% of the aggregate exercise price amount. (For calculating maintenance margin, use current market value instead of option proceeds). Additional margin may be required pursuant to the rules that govern the various exchanges, such as the Chicago Board Options Exchange (CBOE).

In another aspect of the disclosure, derivative investment instruments based on the investment management company index of the present invention are provided. In one embodiment, the derivative investment instruments comprise options and futures contracts based on the investment management company index described herein. As is known in the art, derivative investment instruments in accordance with the principals of the present disclosure may be embodied in a system cooperating with computer hardware components, and as a computer implemented method as well.

Figure 4:
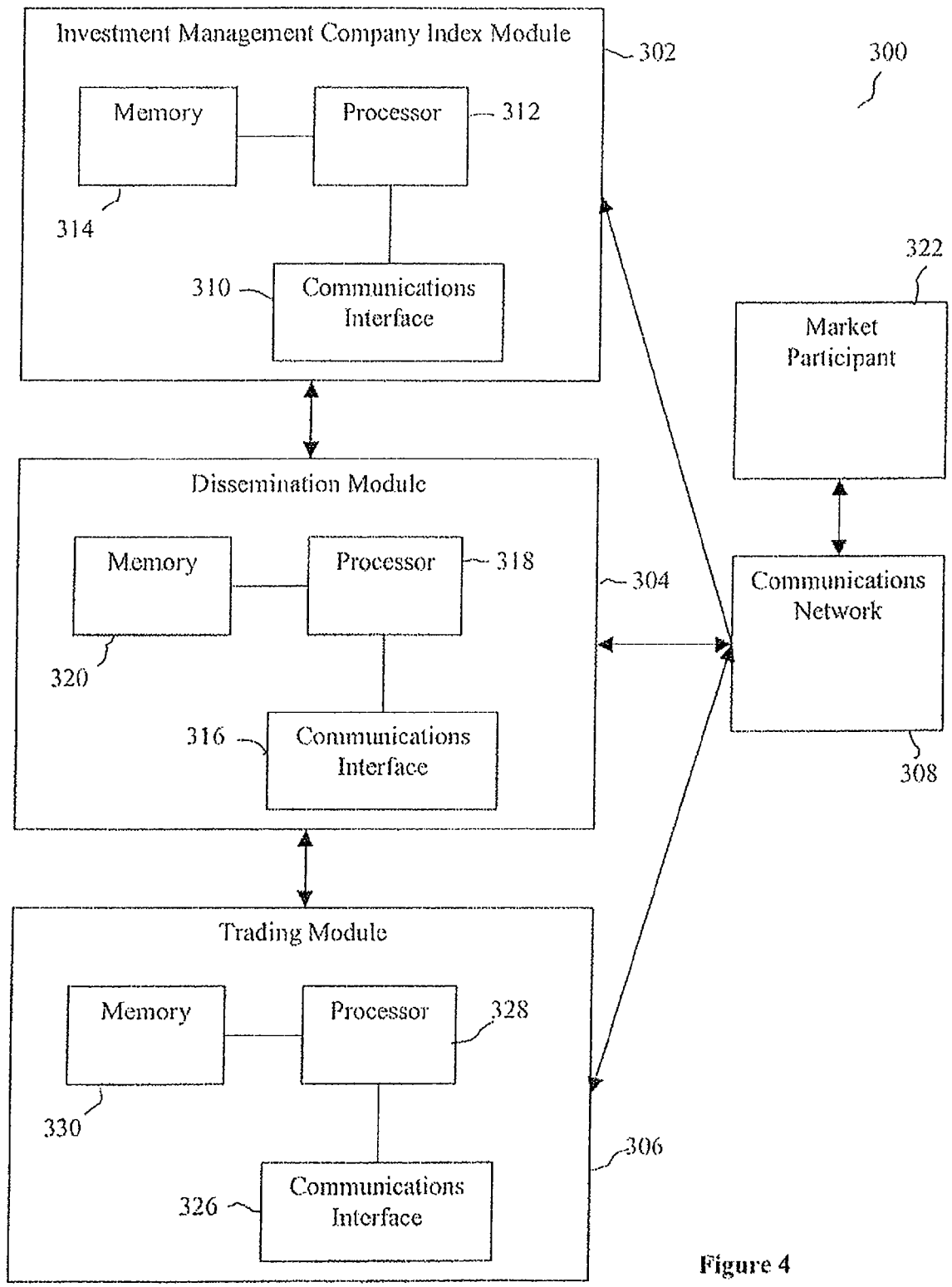
FIG. 4 is a block diagram of one embodiment of a system for creating and trading derivative investment instruments based on an index of investment management companies.

FIG. 4 is a block diagram of a system 300 for creating and trading derivative investment instruments based on an index of investment management companies. Generally, the system comprises an investment management company index module 302, a dissemination module 304 coupled with the investment management company index module 302, and a trading module 306 coupled with the dissemination module 304. Typically, each module 302, 304, 306 is also coupled to a communication network 308 coupled to various trading facilities 322 and liquidity providers 324.

The investment management company index module 302 comprises a communications interface 310, a processor 312 coupled with the communications interface 310, and a memory 314 coupled with the processor 312. Logic stored in the memory 314 is executed by the processor 312 such that the investment management company index module 302 may receive a first set of trade information for each security representative of a desired group of investment management companies through the communications interface 310. The processor will aggregate that first set of trade information over a first time period, calculate an index for the desired group of investment management companies with the aggregated first set of trade information and a standardized measure of the index, as described above, and pass the calculated values to the dissemination module 304.

The dissemination module 304 comprises a communications interface 316, a processor 318 coupled with the communications interface 316, and a memory 320 coupled with the processor 318. Logic stored in the memory 320 is executed by the processor 318 such that the dissemination module 304 may receive the calculated values from the investment management company index module 302 through the communications interface 316, and disseminate the calculated values over the communications network 308 to various market participants 322.

The trading module 306 comprises a communications interface 326, a processor 328 coupled with the communications interface 326, and a memory 330 coupled with the processor 328. Logic stored in the memory 330 is executed by the processor 328 such that the trading module 306 may receive buy or sell orders over the communications network 308, as described above, and pass the results of the buy or sell order to the dissemination module 304 to be disseminated over the communications network 308 to the market participants 322.

Figure 5:
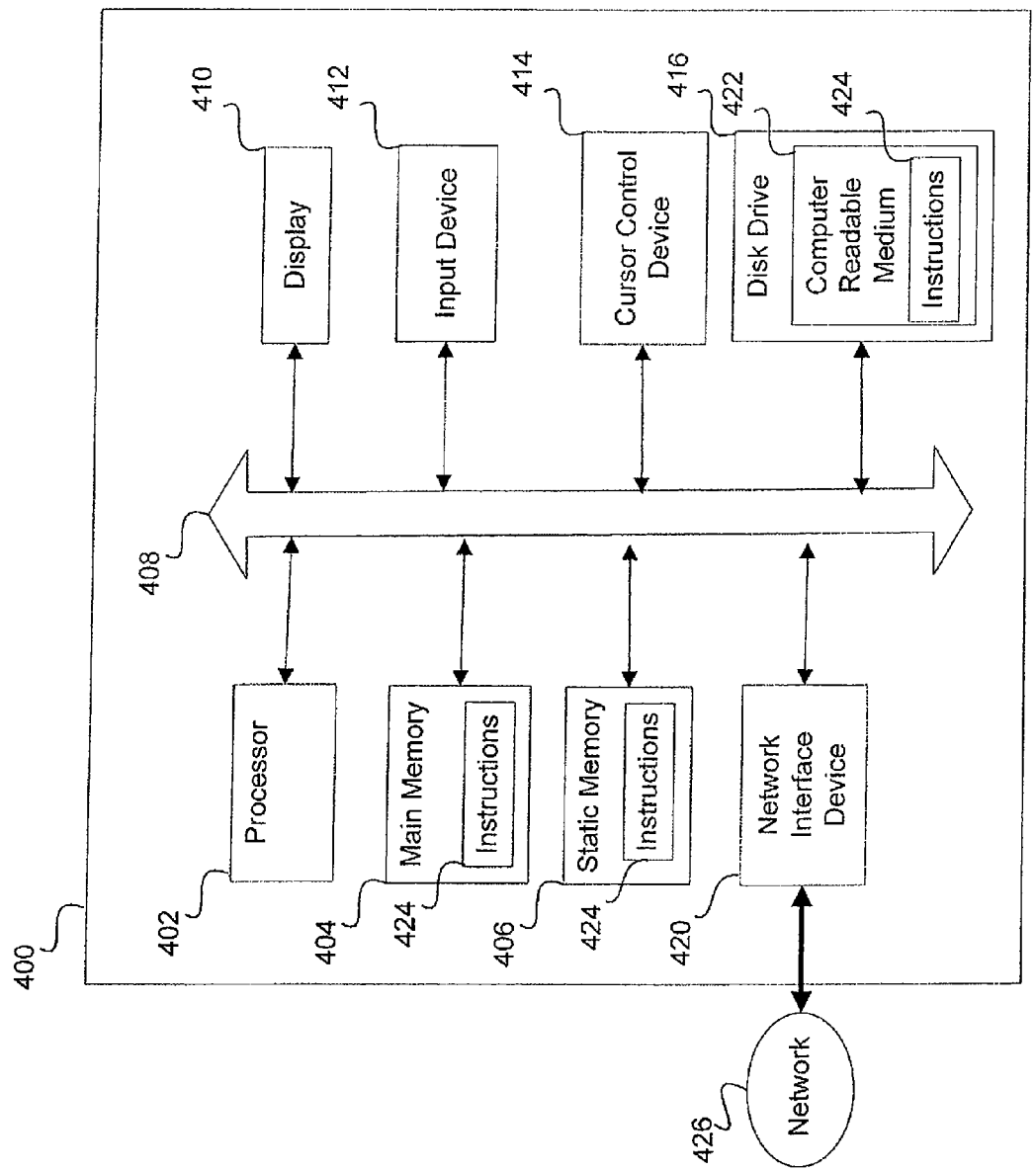
FIG. 5 is a block diagram of a general computing device and network connectivity.

Referring to FIG. 5, an illustrative embodiment of a general computer system that may be used for one or more of the components shown in FIG. 4, or in any other trading system configured to carry out the methods discussed above, is shown and is designated 400. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 5, the computer system 400 may include a processor 402, e.g., a central processing unit (CPU), a graphics processing unit (GPU), or both. Moreover, the computer system 400 can include a main memory 404 and a static memory 406 that can communicate with each other via a bus 408. As shown, the computer system 400 may further include a video display unit 410, such as a liquid crystal display (LCD), an organic light emitting diode (OLED), a flat panel display, a solid state display, or a cathode ray tube (CRT). Additionally, the computer system 400 may include an input device 412, such as a keyboard, and a cursor control device 414, such as a mouse. The computer system 400 can also include a disk drive unit 416, a signal generation device 418, such as a speaker or remote control, and a network interface device 420.

In a particular embodiment, as depicted in FIG. 5, the disk drive unit 416 may include a computer-readable medium 422 in which one or more sets of instructions 424, e.g. software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 424 or receives and executes instructions 424 responsive to a propagated signal, so that a device connected to a network 426 can communicate voice, video or data over the network 426. Further, the instructions 424 may be transmitted or received over the network 426 via the network interface device 420.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols commonly used by investment management companies, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

As will be appreciated by those of ordinary skill in the art, mechanisms for creating a stock index for a predetermined group of investment management companies, derivative investment instruments based thereon and other features described above may all be modified for application to other derivative investment instruments, such as futures, within the purview and scope of the present invention. An advantage of the disclosed methods and derivative investment instruments is that more traders at the exchange may have more opportunity to trade new products and obtain new and valuable market information, thus increasing visibility of orders and the desirability of maintaining a presence at the exchange.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. It is therefore intended that the foregoing detailed description be regarded as illustrative rather than limiting, and that it be understood that it is the following claims, including all equivalents, that are intended to define the scope of this invention.

What is claimed is:

1. A system for creating a stock index for a group of investment management companies, the system comprising:
   an investment management company index module comprising a processor and a memory, the processor configured to execute logic stored in the memory such that the investment management company index module is configured to:
   collect stock price data of the group of investment management companies on a re-balancing date;
   associate a fixed monetary unit value to a stock portfolio comprising the group of investment management companies;
   divide the fixed monetary unit value by a number of constituents in the group of investment management companies to obtain a constituent weighting value;
   divide the stock price data by the constituent weighting value to obtain a constituent rebalancing value; and
   generate a value for an investment management company index based on the constituent rebalancing value.

2. The system of claim 1, wherein the constituent rebalancing value is an approximate value at which each constituent in the group of investment management companies is weighted.

3. The system of claim 1, wherein the investment management company index module is further configured to:
   divide the price by the constituent weighting value; and
   round to the nearest share to obtain a number of shares assigned to the constituent at the re-balancing date.

4. The system of claim 3, wherein the investment management company index module is further configured to:
   adjust shares of the group of investment management companies to maintain that constituent's weight.

5. The system of claim 4, wherein a divisor maintains the continuity of the index.

6. The system of claim 1, wherein the group of investment management companies comprise publicly traded investment management companies deriving at least 50% of their revenues from asset management.

7. The system of claim 1, further comprising:
   a dissemination module in communication with the investment management company index module, the dissemination module comprising a processor and a memory, the processor configured to execute logic stored in the memory such that the dissemination module is configured to:

receive the generated value for the investment management company index from the investment management company index module; and disseminate the generated value for the investment management company index over a communications network to market participants.

8. The system of claim 1, further comprising:

a trading module comprising a processor and a memory, the processor configured to execute logic stored in the memory such that the trading module is configured to:

receive buy and sell orders over a communications network for a position in a derivative instrument that is based on the value of the investment management company index generated by the investment management company index module.

9. The system of claim 8, wherein the derivative instrument is an options contact.

10. The system of claim 8, wherein the derivative instrument is a futures contact.

11. A system for creating a stock index for a group of investment management companies, the system comprising:

an investment management company index module comprising a processor and a memory, the processor configured to execute logic stored in the memory such that the investment management company index module is configured to:

obtain first trade information for each security representative of the group of investment management companies during a first time period;

aggregate the first trade information for the first time period;

store the aggregated first trade information;

calculate from the aggregated first trade information an index for the group of investment management companies;

determine a standardized measure of the index based on the aggregated first trade information; and recalculate the index based on second trade information for each security representative of the group of investment management companies during a second time period.

12. The system of claim 11, further comprising:

a dissemination module in communication with the investment management company index module, the dissemination module comprising a processor and a memory, the processor configured to execute logic stored in the memory such that the dissemination module is configured to:

receive the recalculated index associated with the group of investment management companies from the investment management company index module; and disseminate the recalculated index associated with the group of investment management companies over a communications network to market participants.

13. The system of claim 11, further comprising:

a trading module comprising a processor and a memory, the processor configured to execute logic stored in the memory such that the trading module is configured to:

receive buy and sell orders over a communications network for a position in a derivative instrument that is based on the index for the group of investment management companies generated by the investment management company index module.

14. The system of claim 13, wherein the derivative instrument is an options contact.

15. The system of claim 13, wherein the derivative instrument is a futures contact.

* * * * *